J. Blackwood. Gang Plow.
117970    Fig. 1.    Patented Aug 15 1871
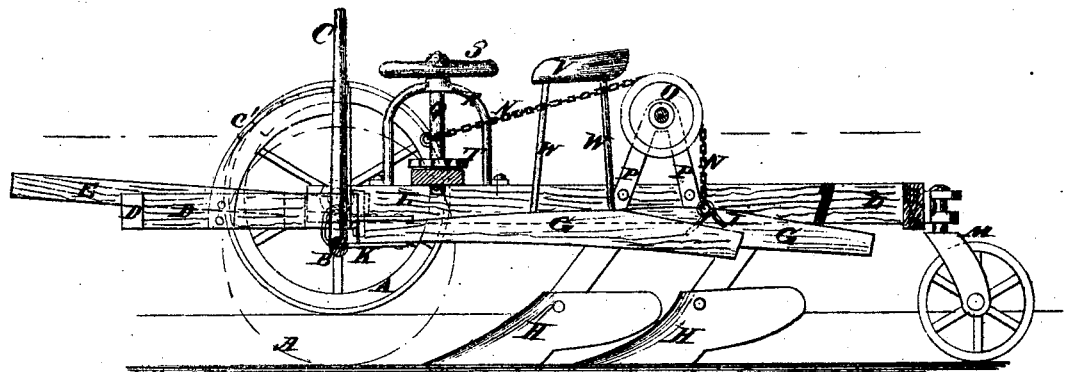
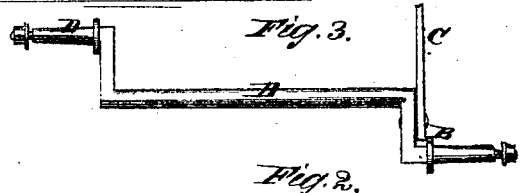
Fig. 3.
Fig. 2.
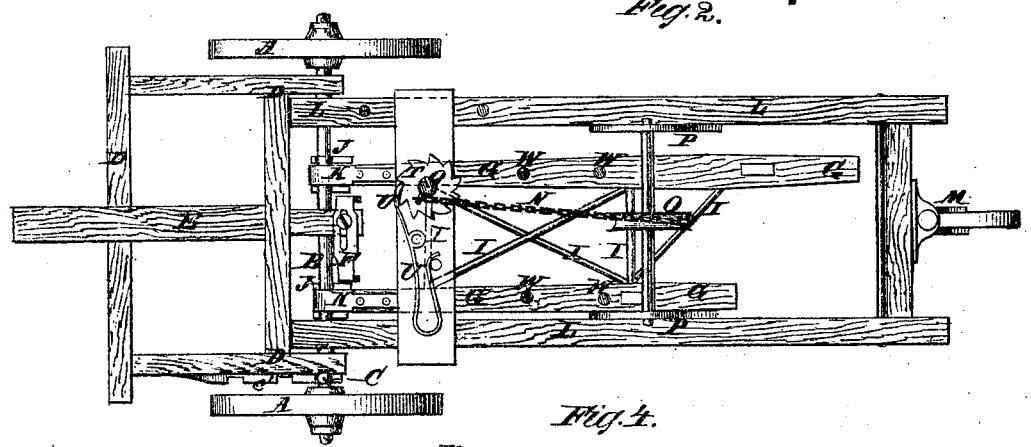
Fig. 4.
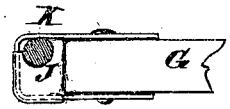
Witnesses:
John Becker
Wm. H. B. Smith
Inventor:
J. Blackwood.
per
Attorneys.

UNITED STATES PATENT OFFICE.

JOHN BLACKWOOD, OF MADISON TOWNSHIP, OHIO.

IMPROVEMENT IN GANG-PLOWS.

Specification forming part of Letters Patent No. 117,970, dated August 15, 1871.

*To all whom it may concern:*

Be it known that I, JOHN BLACKWOOD, of Madison township, in the county Franklin and State of Ohio, have invented a new and useful Improvement in Gang-Plow; and I do hereby declare that the following is a full, clear, and exact description thereof, which will enable others skilled in the art to make and use the same, reference being had to the accompanying drawing forming part of this specification, in which—

Figure 1 is a detail longitudinal section of my improved gang-plow. Fig. 2 is a top view of the same. Fig. 3 is a detail view of the crank-axle. Fig. 4 is a detail view of one of the reversible clevis-blocks.

Similar letters of reference indicate corresponding parts.

My invention has for its object to furnish an improved gang-plow, which shall be so constructed as to plow furrows of uniform width and depth, and which shall raise the furrow slice without pressing upon the bottom of said furrow, leaving the ground at the bottom of the furrow loose and porous; and it consists in the construction and combination of the various parts, as hereinafter more fully described.

A are the wheels, which revolve upon the journals of the axle B. The axle B is made with two short cranks close to its journals, said cranks being turned in opposite directions, as shown in Fig. 3, so that by turning the axle B into such a position that its cranks may be horizontal the machine will run level when the plows are not working, or when striking the first furrows, and by turning the said cranks more or less toward a vertical position the machine may run level while the plows are working at a greater or lesser depth in the ground. The axle B is turned by a lever, C, which is attached to one of its cranks, preferably the one next the furrow-wheel. The lever C is held in any position into which it may be adjusted by the curved notched bar c', which is attached to the side bar of the forward frame D. The forward frame D is made about square, and of such a size as to fit in between the cranks of the axle B. The rear ends of the side bars of the frame D ride upon and are pivoted to the axle B by clips or other bearings. E is the tongue which is attached to the middle part of the frame D, and the rear end of which projects in the rear of the axle B, and has a plate, F, attached to it by means of a screw or bolt, which passes through a slot in the said plate. The ends of the plate F are turned downward to fit between the forward ends of the plow-beams G, so that by adjusting the said plate F the plows may be adjusted toward or from the land. G are the plow-beams, to the rear parts of which are attached ordinary plows H in the ordinary manner. One of the plow-beams G is made enough longer than the other to bring the plows H into a proper relative position. The plow-beams G are connected and held at the proper distance apart by the cross and inclined braces or bolts I. The forward ends of the plow-beams G are connected with the axle B by the clevis-blocks J and clevises or straps K, which pass around the axle B and clevis-blocks J, and their ends are secured to the ends of the said plow-beams G. The clevis-blocks J are made reversible, so that by reversing them the point of draft attachment may be raised or lowered, as may be required. L is the rear frame, the forward ends of the side bars of which fit between the rear ends of the side bars of the forward frame D, ride upon the axle B, and are connected with and pivoted to said axle by clips or other convenient couplings. To the rear cross-bar of the frame L is pivoted a caster-wheel, M, in such a position as to roll along the last furrow and support the rear end of the frame L. N is a chain, the rear end of which is connected with the rear parts of the plow-beams G. The chain N passes over a grooved pulley, O, pivoted to brackets or curved bars P, the ends of which are attached to the side bars of the rear frame L. The forward end of the chain N is attached to the capstan Q, the lower end of which is pivoted to the forward cross-bar of the frame L, and the upper end of which works in a bearing in a bracket, R, attached to the said frame L. To the upper end of the capstan Q is attached a hand-wheel, S, by which it is operated. To the lower part of the capstan Q is attached a ratchet-wheel, T, upon the teeth of which the spring-pawl U takes hold to hold the capstan Q securely in any position into which it may be turned. The spring-pawl U is attached to the front cross-bar of the frame L, in such a position that it may be conveniently reached and operated by the driver from his seat. V is the driver's seat, the supports W of which are attached to the plow-beams G in such a position that the capstan-wheel S may be conveniently reached and operated by the driver from said seat.

By this arrangement the chain N not only raises and lowers the plows, but it also supports them when at work so that they do not press upon and pack the bottoms of the furrows, leaving the ground at the bottoms of the furrows loose and porous. The chain N also enables the depth of the furrows to be regulated at will and without stopping the team.

Having thus described my invention, I claim as new and desire to secure by Letters Patent—

1. The reversible clevis-blocks J, in combination with the axle B, plow-beams G, and clevis or straps K, substantially as herein shown and described, and for the purpose set forth.

2. The arrangement of the wheels A, double crank-axle B, lever C, catch-bar c', forward frame D, tongue E, adjustable slotted gauge-plate F, plows G H, inclined and cross-braces or bolts I, reversible clevis-blocks J, clevises or straps K, rear frame L, caster-wheel M, chain N, pulley S, brackets P, capstan Q, bracket R, hand-wheel O, ratchet-wheel T, spring-pawl U, and driver's seat V W, with each other, substantially as herein shown and described, and for the purposes set forth.

JOHN BLACKWOOD.

Witnesses:
  JOHN MONHART,
  SAML. FEUSTERMAKER.